United States Patent
Maricic et al.

(10) Patent No.: US 9,967,716 B2
(45) Date of Patent: May 8, 2018

(54) SYSTEM FOR PROTECTED LOCATION BEACON CODE GENERATION

(71) Applicant: GENERAL ELECTRIC COMPANY, Schenectady, NY (US)

(72) Inventors: Danijel Maricic, Niskayuna, NY (US); Michael James Hartman, Clifton Park, NY (US); John Erik Hershey, Ballston Lake, NY (US); Stanislava Soro, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 57 days.

(21) Appl. No.: 15/276,167

(22) Filed: Sep. 26, 2016

(65) Prior Publication Data
US 2018/0091954 A1    Mar. 29, 2018

(51) Int. Cl.
*H04W 24/00* (2009.01)
*H04W 4/04* (2009.01)
*H04W 48/10* (2009.01)
*H04L 29/08* (2006.01)
*H04W 64/00* (2009.01)
*G01C 21/20* (2006.01)

(52) U.S. Cl.
CPC .......... *H04W 4/043* (2013.01); *G01C 21/206* (2013.01); *H04L 67/02* (2013.01); *H04W 48/10* (2013.01); *H04W 64/003* (2013.01)

(58) Field of Classification Search
CPC .................................................... H04W 4/043
USPC ......................................................... 455/457
See application file for complete search history.

(56) References Cited

U.S. PATENT DOCUMENTS

| | | | |
|---|---|---|---|
| 8,284,100 B2 | 10/2012 | Vartanian et al. | |
| 8,749,797 B1 | 6/2014 | Granade et al. | |
| 8,878,666 B2 | 11/2014 | Chu | |
| 2009/0088183 A1 | 4/2009 | Piersol et al. | |
| 2011/0177808 A1 | 7/2011 | Grokop et al. | |
| 2012/0282926 A1 | 11/2012 | Zappulla et al. | |
| 2013/0048707 A1 | 2/2013 | Do | |
| 2014/0280316 A1 | 9/2014 | Ganick et al. | |
| 2015/0054682 A1 | 2/2015 | Hryciuk et al. | |

FOREIGN PATENT DOCUMENTS

CN        201400196 Y      2/2010

*Primary Examiner* — Joel Ajayi
(74) *Attorney, Agent, or Firm* — Nitin N. Joshi

(57) ABSTRACT

A method for navigating within a retail establishment includes:
generating and distributing an encoded identity to each of a plurality of location beacons, the encoded identity being effective during a time interval;
broadcasting the encoded identity from each of the plurality of location beacons to a user device within a retail establishment;
mapping the encoded identity of each of the plurality of location beacons to a location thereof;
generating a masked mapping by combining the mapping with a time interval mask;
storing the masked mapping in a website accessible to the user device; and
broadcasting an srw signal to the user device within the retail establishment, the srw signal comprising information for recovering the mapping from the masked mapping in the web site;
whereby navigation via the location beacons is enabled.

4 Claims, 5 Drawing Sheets

$\pi_i$ is the permutation of the beacon broadcast encoded identities at time interval i $\pi_{i+1}$ is the permutation of the beacon broadcast encoded identities at time interval i+1

SYSTEM FOR PROTECTED LOCATION BEACON CODE GENERATION

BACKGROUND

In a commercial retail establishment, an indoor positioning system may be based on RF, visible light, or acoustic beacons. The location of a user' device equipped with a suitable sensor or multiple sensors (e.g., a device) can be computed from the signals received from one or more anchor node beacons, or beacons, for short. Beacons may be of one or multiple types. The information captured from the beacons may include beacon signal strength, image of the beacon, and the data-code emitted by the beacon. The location computation is based on the beacon information captured at a given location and matched with the prior information about the indoor space. This prior information includes the map of the indoor space, the location of the beacons in the space along with the beacon codes for each of the beacons.

If the beacon codes remain constant, there is an opportunity for others to build applications that use the same beacon infrastructure. All that would be required is to survey the space, produce a map or have map provided by a map provider, locate the beacons and use the same beacon data that is emitted from each of the beacons. The ownership of such an indoor positioning system could not be preserved.

BRIEF DESCRIPTION

One object of the location beacon system and method is to make it difficult for an interloper to successfully recover the extant mapping. A second object is to provide a customer with a seamless transition between mappings. A third object is to enable the owner of the system, which may be a retail store or other commercial establishment to be able to determine which registered customers are within the commercial retail establishment.

Briefly, in one aspect, the present invention relates to a beacon location method includes:
  generating and distributing an encoded identity to each of a plurality of location beacons, the encoded identity being effective during a time interval;
  broadcasting the encoded identity from each of the plurality of location beacons to a user device within a retail establishment;
  mapping the encoded identity of each of the plurality of location beacons to a location thereof;
  generating a masked mapping by combining the mapping with a time interval mask;
  storing the masked mapping in a website accessible to the user device; and
  broadcasting an srw signal to the user device within the retail establishment, the srw signal comprising information for recovering the mapping from the masked mapping in the web site;
whereby navigation within the retail establishment via the location beacons is enabled.

In another aspect, the present invention relates to a beacon location system that includes:
  a plurality of location beacons;
  a customer associate controller for generating an encoded identity for each of the plurality of location beacons effective during a time interval, distributing the encoded identity thereto, and generating a masked mapping of each encoded identity to a location of each location beacon;
  a website accessible to a user device; and
  one or more srw broadcasters for broadcasting an srw signal to the user device within the retail establishment, the srw signal comprising information for recovering the mapping from the masked mapping.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The Location Beacon System

A location beacon system according to the present invention includes location beacons which may, for example, be incorporated into ceiling light fixtures and provide a geolocation broadcast. The beacons have two functions. First, using optical light as an example, a location beacon transmits an encoding of its identity. The identity of a location beacon serves to properly associate its optical transmissions with its (x,y,z) location within the commercial retail establishment.

Figure 1:
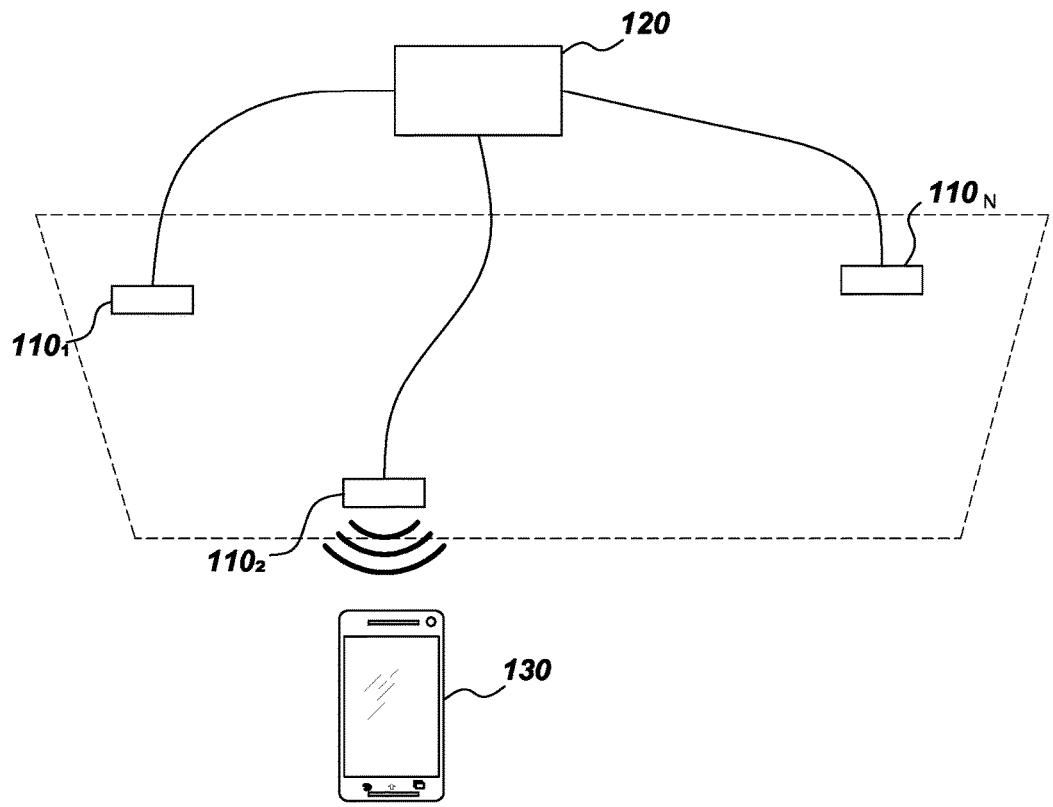
FIG. 1 illustrates the broadcasting of geolocation information to registered customer Devices carried by customers visiting the commercial retail establishment.

As illustrated in FIG. 1, location beacons $110_1$-$110_N$ are operably connected to the mapping and customer associate controller 120 that generates the encodings of the location beacon identities and distributes the generated encoded identities to the location beacons. The location beacons broadcast within the commercial retail establishment and their broadcasts are received and processed by a registered customer's device 130 to allow navigation of the commercial retail establishment.

The beacons in a commercial retail establishment are expected to remain fixed in their locations but to change their broadcast encoded identities on a periodic or aperiodic basis, thus rendering any copied mapping between the beacon locations and their broadcast encoded identities to possess no more than ephemeral value.

A mapping between the beacon broadcast encoded identities to the fixed beacon locations may be viewed as the permutation set forth in Table 1. Table 1 assumes the use of N beacons. The left-hand column lists the time-invariant locations of the N beacons and the right-hand column is a permutation of the beacon broadcast encoded identities. The mapping of the beacon broadcast encoded identities changes periodically or aperiodically. The notation used is to be interpreted as follows: $[\pi(1), \pi(2), \ldots, \pi(N-1), \pi(n)]$ is a permutation of $[1, 2, \ldots, N-1, N]$. This permutation is developed and disseminated by the mapping and customer associate controller 120 and passed to a customer's device in order that a customer who is registered with or authorized by the owner of the system may use the establishment's location beacon system to navigate through the establishment.

TABLE 1

The Mapping between Beacon Locations and their Identities

| Beacon Location | Beacon Broadcast Identity |
|---|---|
| $(x_1, y_1)$ | $C_{\pi(1)}$ |
| $(x_2, y_2)$ | $C_{\pi(2)}$ |
| ... | ... |
| $(x_{N-1}, y_{N-1})$ | $C_{\pi(N-1)}$ |
| $(x_N, y_N)$ | $C_{\pi(N)}$ |

An Example Encoding of the Mapping of Table 1

The mapping set forth in Table 1, the mapping between beacon locations and their broadcast encoded identities, is a permutation of N items. Encoding this mapping requires a minimum of rig, $\lceil N! \rceil$ bits, where $\lceil \bullet \rceil$ is interpreted to be the smallest integer greater than or equal to the argument. Encoding the mapping according to this most efficient binary representation would require extensive computations involving very large integers. An example of a much simpler way of sending the information of Table 1 is to encode the broadcast encoded identities as they appear in the top-to-bottom order of the right-hand column of Table 1. Each broadcast encoded identity requires a minimum of $\lceil \lg_2 N \rceil$ bits. There are N of the beacon code identifiers and therefore $N \lceil \lg_2 N \rceil$ bits need to be sent. This simpler way of encoding the mapping of Table 1 requires more bits than the most efficient, but much more complex, binary representation however the extra number of bits required is not expected to be significant with respect to the NFC data exchange. For example, if N=32, then a minimum of rig, $\lceil \lg_2 =! \rceil = 120$ bits are required to specify the mapping of Table 1. The much simpler way of encoding the Table 1 mapping requires $32\lceil \lg_2 32 \rceil = 160$ bits, which is only 40 bits more than the minimum number of bits required.

Intervals

Figure 2:
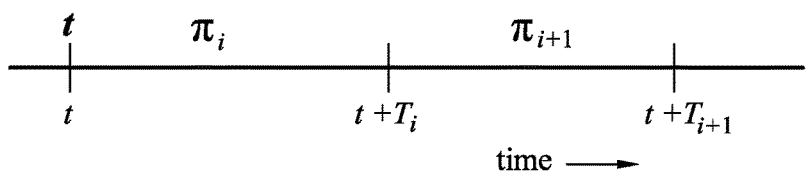
FIG. 2 illustrates two consecutive intervals of respective durations and time units.

Referring to an example based on FIG. 2, intervals are continuous stretches of time. The stretches of time are not necessarily equal. In general, the i-th stretch of time is of duration $T_i$ time units and the location beacon system uses a new mapping at the start of a new interval. In the example, the new mappings are initiated at times $t+T_i$, $t+T_{i+1}$, .... In FIG. 2, the mapping $\Pi_i$ is in effect during time interval i and the mapping $\Pi_{i+1}$ is in effect during time interval i+1.

Registering a Customer

In order for a customer or other user to use the commercial retail establishment's location beacon system, the user device must first be registered with the system and provided with a free APP from the system's website. Under operating conditions to be discussed later, the APP will allow the user device to make use of the permutation in effect during a given interval along with the beacon information to allow the user device to determine its position within the commercial retail establishment. A user device may be, for example, a mobile phone or smartphone, or other device having functionality to detect, receive, and process srw signals and signals broadcast by the location beacons. The functionality to detect, receive, and process signal by mobile device as it traverses the retail establishment may be implemented by hardware (e.g., an antenna, a transceiver, etc.), software (e.g., firmware, an application or "app", etc.) or a combination thereof.

Masking a Mapping

The mapping in effect during time interval i, $\Pi_i$, comprises the p-bit string $m_{i1}$, $m_{i2}$, ..., $m_{ip}$. This mapping is made into a MASKED MAPPING by combining it with its associated INTERVAL MASK in such a manner that the mapping may not be recovered without its associated INTERVAL MASK. In one embodiment, the associated INTERVAL MASK is the random or pseudorandom p-bit string $q_{i1}$, $q_{i2}$, ..., $q_{ip}$ produced by the mapping and customer associate controller 120 and the MASKED MAPPING during time interval i is formed by bit-by-bit exclusive-oring of the two p-bit strings to form the p-bit string $\{m_{i1} \oplus q_{i1}, m_{i2} \oplus q_{i2}, ..., m_{ip} \oplus q_{ip}\}$ where the binary operation $\oplus$ is the exclusive-or as defined in Table 2.

TABLE 2

The Exclusive-Or Operation on Bits x and y

| x | y | x $\oplus$ y |
|---|---|---|
| 0 | 0 | 0 |
| 0 | 1 | 1 |
| 1 | 0 | 1 |
| 1 | 1 | 0 |

Note that the linearity of the exclusive-or operation allows the mapping to be recovered by bit-by-bit exclusive-oring the MASKED MAPPING with its associated INTERVAL MASK.

The Web Site and the APP

Figure 5:
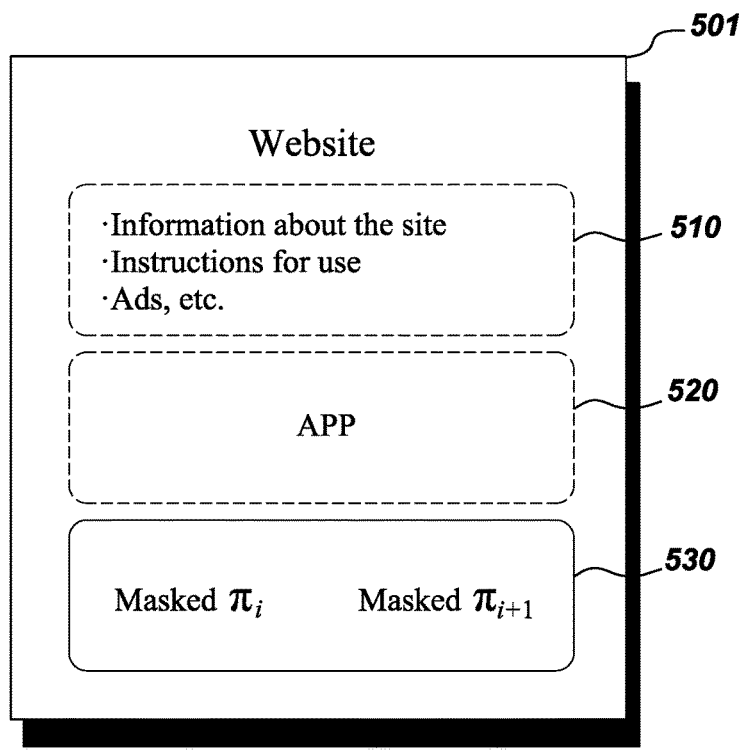
FIG. 5 illustrates the web site and its components.

Customers who wish to use their devices to navigate the commercial retail establishment by aid of the establishment's beacons, may be registered with the commercial retail establishment's website. FIG. 5 illustrates an example of the website 501 as comprising three domains. Domain 510 informs the visitor about the website's purpose, provides instructions as to using the website, and may present advertisements and other notices that the commercial retail establishment believes are useful or necessary for the consumer. Domain 510 is accessible to any website visitor. Domain 520 is the APP, the application that will allow a visitor in good standing with the commercial retail establishment with a registered device to enter the establishment and navigate it with the aid of the establishment's location beacons and the srw broadcast. Domain 520 is accessible to any website visitor. The website's domain 530 is accessible only to a device whose customer ID has been registered according to directions provided in domain 510. Domain 530 provides the MASKED MAPPINGS for the present and subsequent intervals which may be termed a present masked mapping and a subsequent masked mapping. The subsequent masked mapping supplants the present masked mapping when a notification is broadcast broadcast by srw signal identifying the subsequent masked mapping as the present masked mapping. By providing the MASKED MAPPINGS for the present and subsequent intervals, that is, the present masked mapping and subsequent masked mapping, the customer's device 130 effects a seamless transition between mappings when the present interval expires.

Operation of the System

Figure 3:
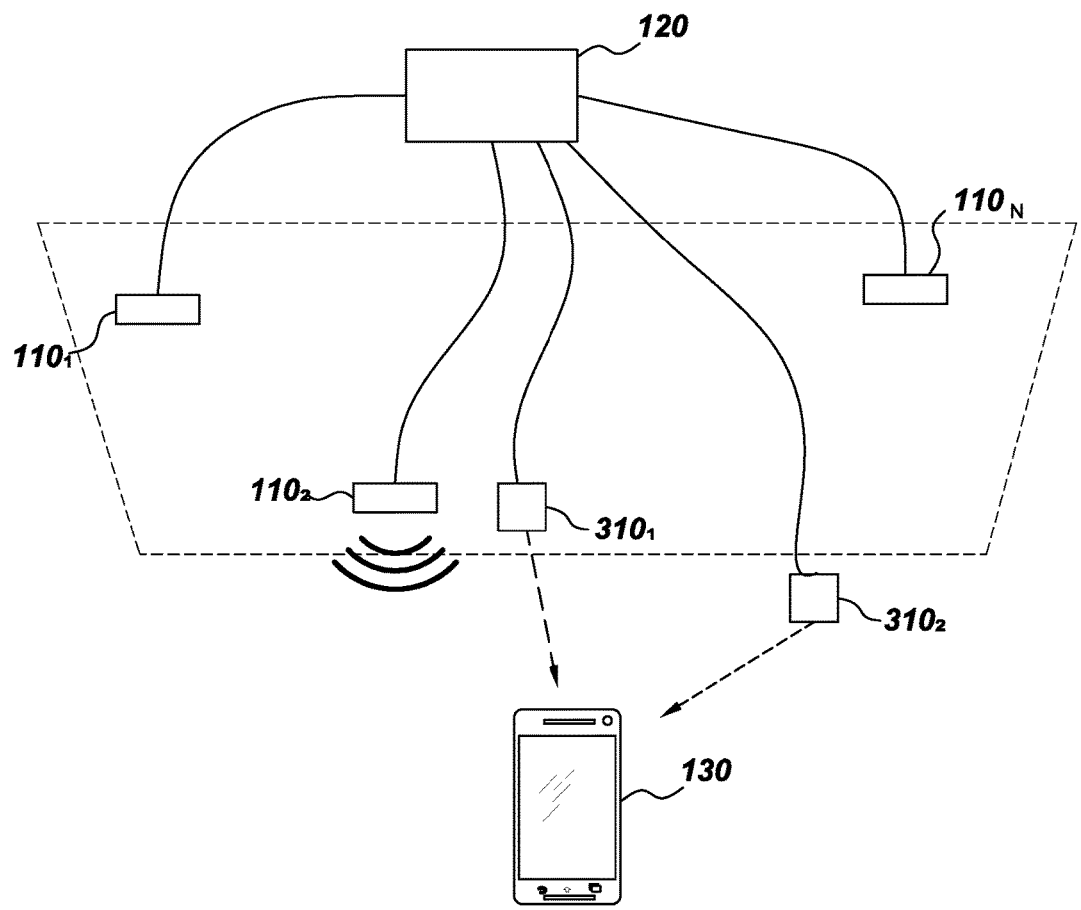
FIG. 3 illustrates the two wireless signals received by the Device.
Figure 4:
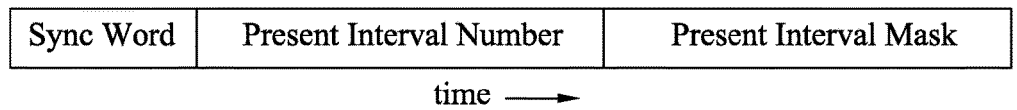
FIG. 4 illustrates the repeating sequence of the srw broadcast.
Figure 6:
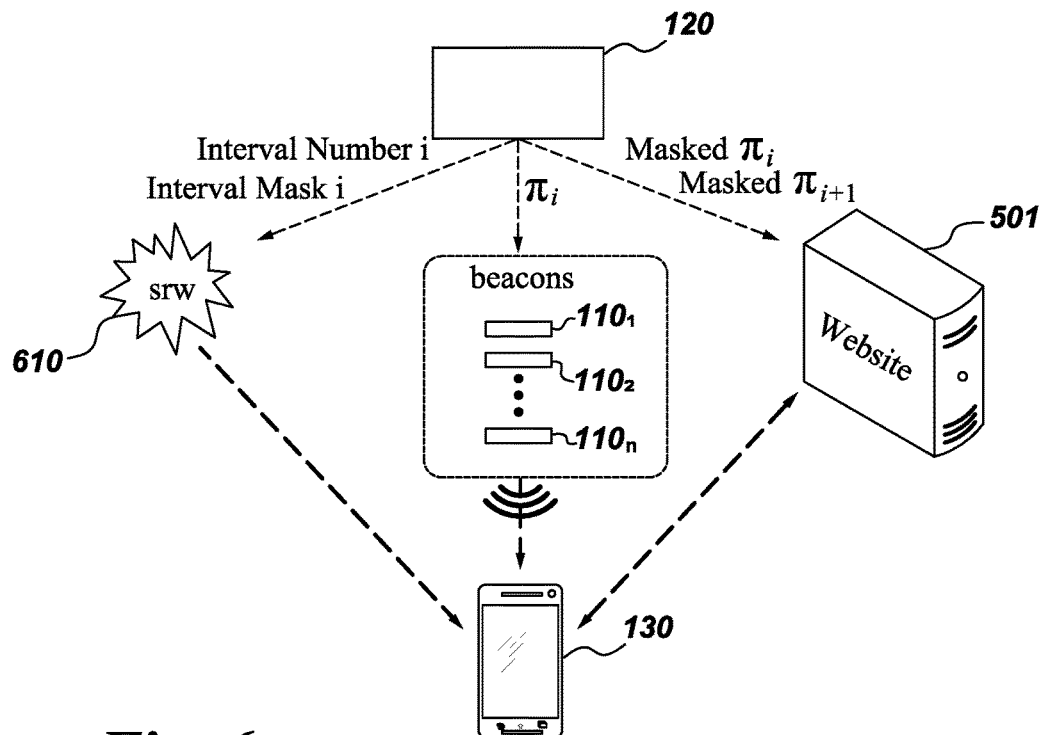
FIG. 6 illustrates the routing of pieces of information.

FIG. 6 illustrates what pieces of information are generated and passed to the customer's device 130 and by what routes the pieces of information are sent. As illustrated in FIG. 6, the information that is passed to the device consists of the N encoded location identities of the location beacons, the present INTERVAL NUMBER and the present INTERVAL MASK, and the MASKED MAPPINGS for the present interval and the subsequent interval. These pieces of information may be generated by the customer associate controller 120 and their paths to the customer's device are partitioned as follows: While inside the commercial retail establishment, the customer's device 130 receives the encoded location identities of the location beacons $110_1$-$110_N$. The srw communication system 610 broadcasts a data sequence that may include the present INTERVAL NUMBER and the present INTERVAL MASK that is used to generate the MASKED MAPPINGS. In the example illustrated in FIG. 3, the srw communication system 610 includes two srw signal broadcast devices $310_1$ and $310_2$. The MASKED MAPPINGS for the present interval and the subsequent interval are posted in the domain 530 of the website 501.

Figure 7:
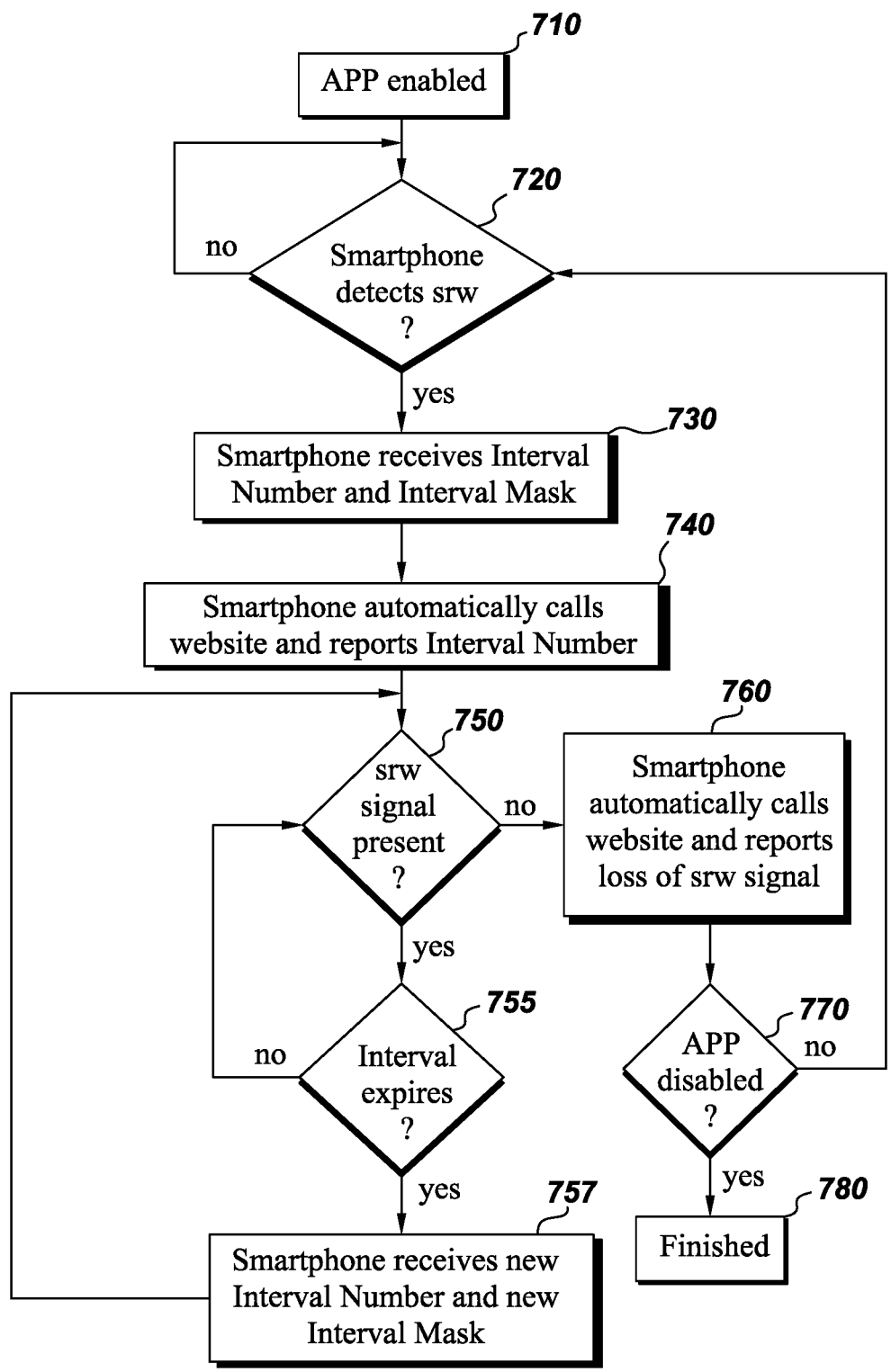
FIG. 7 illustrates a flowchart of an example of the system operation.

FIG. 7 is a flowchart of an example of the system operation from the point of view of the customer's device 130. The customer enables the APP at or about the time that the customer enters the commercial retail establishment as reflected in block 710. The process then passes to block 720. Once the APP has been enabled, the customer's device listens for the srw. The branch marked "NO" exiting from the block 720 and returning to block 720 is to be interpreted as the customer's device continually looking for the presence of the srw. In one embodiment a time limit will be imposed on the amount of time the process may remain in block 720 before terminating the process and disabling the APP. Once the srw has been detected by the device in block 720, the process passes to block 730 wherein the device receives the INTERVAL NUMBER and INTERVAL MASK from the srw that is continually transmitting them. Once these data have been received by the device, the process passes to block 740 wherein the device automatically calls the website 501 and reports the INTERVAL NUMBER. The website 501 notifies the mapping and customer associate controller 120 which enrolls the customer into the in-store presence directory. The process then passes to block 750. The srw signal is continually monitored as indicated by the process block 750. If the srw signal remains present, then the srw signal is continually checked in block 755 to see if the INTERVAL has expired. If the INTERVAL has not expired the srw signal continues to be checked for its presence. If the INTERVAL has expired, then the process passes from block 755 to block 757 in which the device receives the new INTERVAL NUMBER and the new INTERVAL MASK and after which the srw signal presence continues to be checked. If, in block 750, the srw signal is found missing, the process moves to block 760 in which the device automatically calls the website 501 and reports the loss of the srw signal. The website 501 notifies the mapping and customer associate controller 120 which de-enrolls the customer from the in-store presence directory.

The process then passes to block 770 where the state of the APP is examined. If the APP has been disabled, such as by the customer on or about the time the customer departs from the commercial retail establishment, the process is finished as illustrated by passage to block 780. If, however, the APP is still enabled then the process passes back to block 720 wherein the customer's device once again continually looks for the srw. In one embodiment the device automatically calls the website before passing to block 720 and reports its last position as determined from the location beacons. This reporting may assist the commercial retail establishment in detecting and locating dead spots in the reception of the srw. In yet another embodiment, on passage to block 780, the device automatically calls the website and reports a record of measured srw strength versus the device path within the commercial retail establishment. This reporting may assist the commercial retail establishment in planning the positioning or repositioning of the srw signal broadcast devices for better coverage.

Mapping and Customer Associate Controller

The mapping and customer associate controller 120 is the component of the location beacon system that generates the mappings, controls the location beacons, receives and maintains customer registration data, manages the in-store presence directory, and communicates with a web server that disseminates the mappings to a registered customer who accesses the web server.

Figure 8:
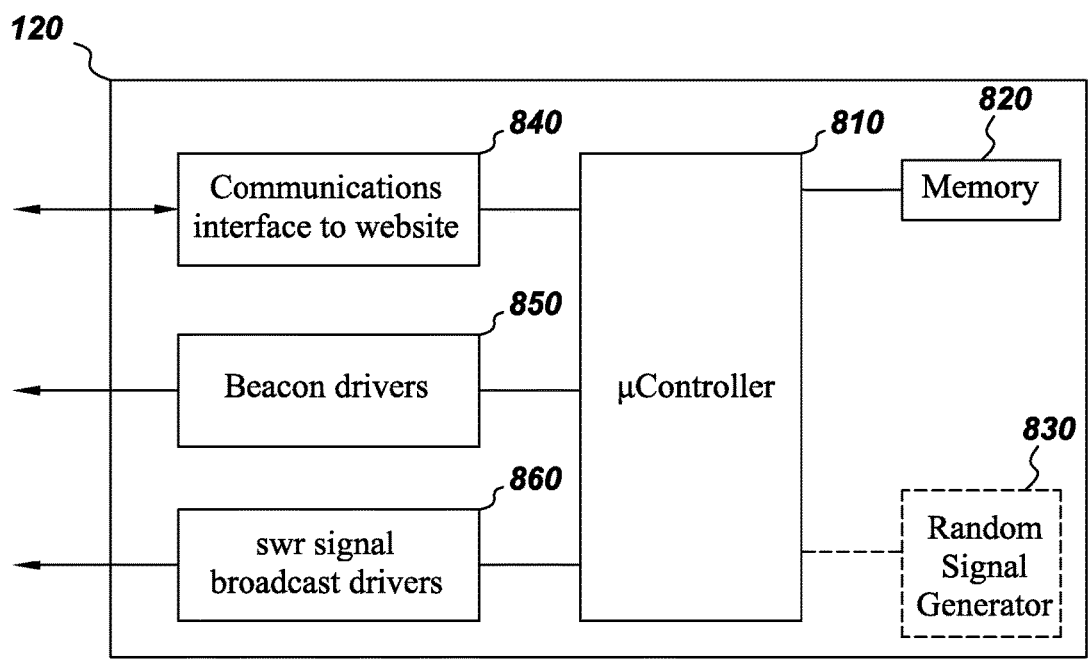
FIG. 8 illustrates some of the components comprised by the mapping and customer associate controller.

FIG. 8 illustrates some of the components of the mapping and customer associate controller 120. Computations are sequenced and performed by a microcontroller 810. The microcontroller 810 is operably connected to a memory 820 whose hosting includes the in-store presence directory. The mapping and customer associate controller 120 may comprise a random signal generator 830 that is operably connected to the microcontroller 810. In the execution of its algorithms, the microcontroller 810 may occasionally require numbers that are not predictable by an interloper. These numbers may be pseudorandomly generated, that is generated with an underlying determinism, such as by a software pseudorandom number generator, or they may be generated by a random signal generator 830 such as is provided by a hardware module comprising such entities as thermal noise digitization and back-biased diode currents.

The microcontroller 810 is further operably connected to a communications interface 840 to the website 501. Further, the microcontroller 810 controls the location beacons $110_1$-$110_N$ through drivers 850 comprising electrical switching. Also, the microcontroller 810 controls the srw signal broadcast devices 860.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A beacon location method comprising:
generating and distributing an encoded identity to each of a plurality of location beacons, the encoded identity being effective during a time interval;
broadcasting the encoded identity from each of the plurality of location beacons to a user device within a retail establishment;
mapping the encoded identity of each of the plurality of location beacons to a location thereof;
generating, by a customer associate controller using at least one of a hardware random signal generator and a software pseudorandom generator, a data sequence comprising a time interval mask;
generating a masked mapping by combining the mapping with the time interval mask;
storing the masked mapping in a website accessible to the user device; and
broadcasting a signal to the user device within the retail establishment, the signal comprising information for recovering the mapping from the masked mapping in the website, the information comprising a present masked mapping and a subsequent masked mapping; and wherein the subsequent masked mapping supplants the present masked mapping upon notification of the identification of the subsequent masked mapping as the present masked mapping;

whereby navigation within the retail establishment via the location beacons is enabled.

2. A beacon location system configured to perform the method of claim 1, the system comprising:

a plurality of location beacons;

a customer associate controller for generating an encoded identity for each of the plurality of location beacons effective during a time interval, for distributing the encoded identity thereto, and generating a masked mapping of each encoded identity to a location of each location beacon;

a website accessible to a user device; and one or more broadcasters for broadcasting a signal to the user device within the retail establishment, the signal comprising information for recovering the mapping from the masked mapping.

3. The system of claim 2 wherein broadcasts from each of the plurality of location beacons comprise at least one of an optical signal, an RF signal, and an audio signal.

4. The system of claim 2 where the broadcasts from each of the one or more broadcasters comprise at least one of an optical signal, an RF signal, and an audio signal.

\* \* \* \* \*